United States Patent [19]
Fundneider

[11] Patent Number: 4,592,045
[45] Date of Patent: May 27, 1986

[54] CIRCUIT FOR THE SUBSCRIBER TERMINATION IN AN INTEGRATED SERVICES DIGITAL NETWORK

[75] Inventor: Oswald Fundneider, Puchheim, Fed. Rep. of Germany

[73] Assignee: Siemens Aktiengesellschaft, Berlin & Munich, Fed. Rep. of Germany

[21] Appl. No.: 607,123

[22] Filed: May 3, 1984

[30] Foreign Application Priority Data

May 5, 1983 [DE] Fed. Rep. of Germany ....... 3316492

[51] Int. Cl.[4] .......................... H04Q 11/04; H04J 3/12; H04M 3/00

[52] U.S. Cl. .................................. 370/58; 370/110.1; 179/18 ES

[58] Field of Search ....................... 370/58, 60, 66, 67, 370/65, 110.1, 111; 179/84 VF, 84 SS, 41 A, 18 ES, 18 J

[56] References Cited

U.S. PATENT DOCUMENTS

| | | | |
|---|---|---|---|
| 3,542,957 | 11/1970 | Mitchell et al. | 370/111 |
| 3,708,625 | 1/1973 | Angeleri et al. | 370/111 |
| 3,729,590 | 4/1973 | Widl et al. | 370/110.1 |
| 4,466,095 | 8/1984 | Kawano et al. | 370/58 |
| 4,486,878 | 12/1984 | Havermans | 370/60 |

OTHER PUBLICATIONS

E. Blum et al., "The Design and Applications of PCM Signalling Multiplexers," Budavox Telecomm. Rev., No. 3, 1979, pp. 1–16.
R. Trachsel, "64 Kbit/s Data Adaption Unit for 2048 Kbit/s PCM Terminals (DAV 64)", Hasler Rev., No. 3/4, vol. 12, 1979, pp. 82–91.
"D-Channel Protocol: Role, Requirements, Level 2 Implications," R. Parodi et al., IEEE Global Telecommunications Conference, Globecom '82, 1982, pp. 757–761.
"Concentration Techniques in a Digital Network with Decentralize Exchange," Behr et al., International Switching Symposium, Sep. 1981, pp. 1–6.
"ISDN Customer to Network Signalling D-Channel Protocol Level 1 Aspects," Moore et al., IEEE Global Telecommunications Conference Globecom '82, 1982 pp. 750–756.
"Considerations on Customer Access to the ISDN", Waber, Proceedings 1982 International Symposium on Subscriber Loops and Services, pp. 66–70.
"A New Channel Protocol and Inhouse Network Configuration", Takemura et al., IEEE International Conference on Communications, Jun. 1982, pp. 1–4.
"Mögliche Integration von Fernmeldediensten im Digitalen Fernsprechnetz", Rosenbrock, VPF 1982, vol. 9, pp. 24–31.
"Arbeit im CCITT zum Aufbau Einheitlicher Dienstintegrierter Digitaler Fernmeldenetze", Thiele, et al., Fernmeldetechnik 22 (1982)2, pp. 67–79.
"Funktionsbeziehunger Eines Integrierten Digitalen Fernmeldenetzes, Teil 1", Thiele et al., Fernmeldetechnik 23 (1983)1, pp. 6–9.
"Wege zu Einem Dienstintegrierten Nachrichtennetz für Sorache, Text, Bilder und Dated", Hubner et al., Fernmeldetechnik, 23 (1983)1, pp. 9–14.

Primary Examiner—Douglas W. Olms
Assistant Examiner—Wellington Chin
Attorney, Agent, or Firm—Hill, Van Santen, Steadman & Simpson

[57] ABSTRACT

A circuit for the subscriber termination in an integrated services digital network (ISDN) to which a number of individual terminals are connected by respective S-interfaces, or by S-interface busses respectively combining a number of terminals into a common ISDN network termination, each subscriber line having a B+B+D channel structure, has a switching matrix operated by a switching control for selectively connecting B-channels to each other or through-connecting a B-channel to a switching center. The D-channels in the transmission direction toward the switching control are supplied to an AND gate having an output which is a common D-channel connected to the switching control and which is also connected through a common D-echo channel to the D-echo channels in the opposite transmission direction associated with the S-interfaces. The D-channels in the transmission direction toward the switching control are also connected to an identifier which supplies information to the switching control identifying from which S-interface the signal being transmitted arises.

5 Claims, 2 Drawing Figures

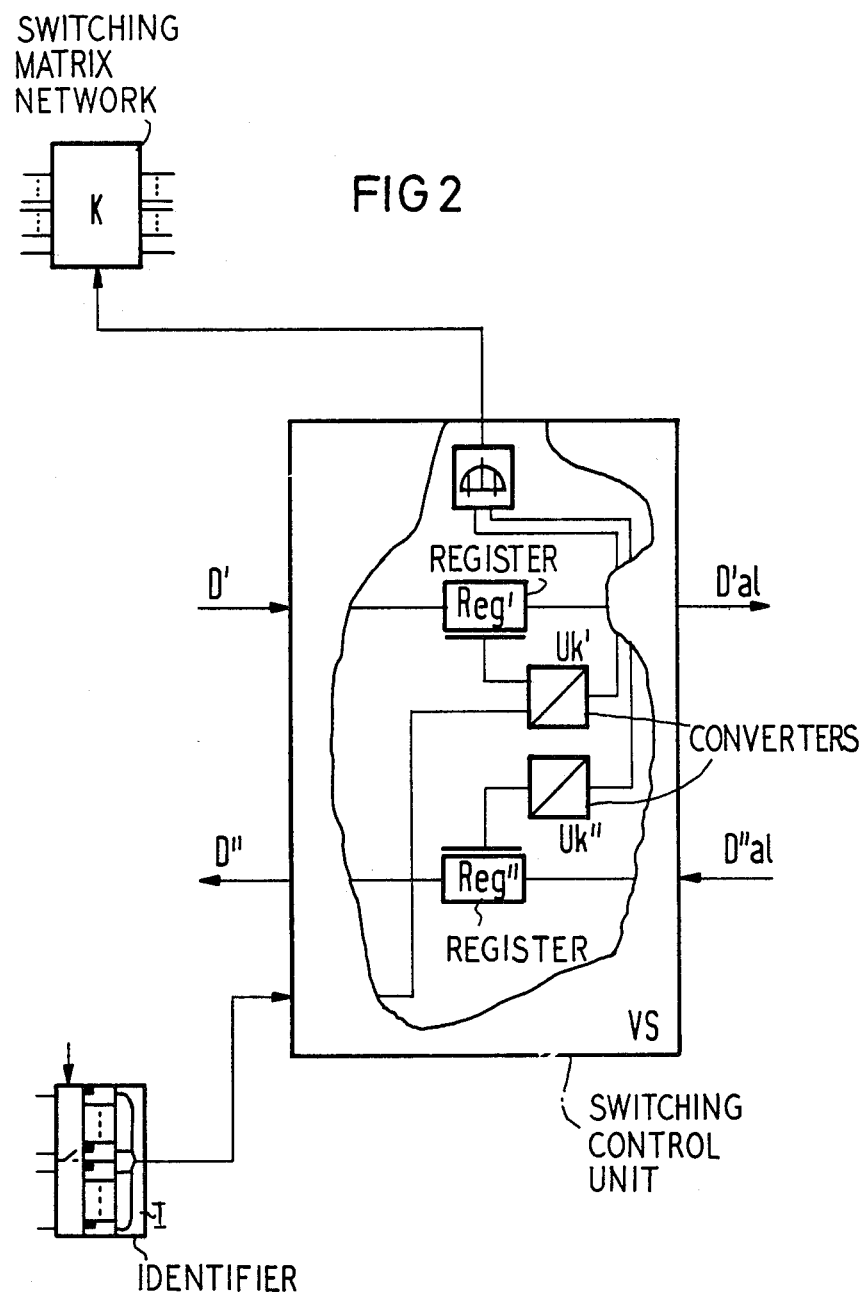

CIRCUIT FOR THE SUBSCRIBER TERMINATION IN AN INTEGRATED SERVICES DIGITAL NETWORK

BACKGROUND OF THE INVENTION

The present invention is directed to a circuit for the suscriber termination in an integrated services digital network (ISDN) in which text, pictures and data are communicated (transmitted and switched) in addition to speech in common telecommunication channels having, for example, a bit rate of 64 kbit/s per transmission direction. Subscribers are enabled for use of the various telecommunications services by means of a common subscriber termination to which terminal equipment for telephony, text communication, picture communication and data communication can be connected in a variety of configurations. The ISDN subscriber termination must exhibit basic properties suitable for this purpose, particularly with respect to the bit rate, the signaling possibilities, and the range.

A so-called basic access having a channel structure designated B+B+D (per transmission direction) has evolved in this context in the international discussion and standardization of this field at the CEPT and the CCITT, wherein B designates a 64 kbit/s channel which can transmit digitally encoded information of different types such as voice, text, facsimile, and data simultaneously, alternatively from connection to connection or within one connection, or in fixed allocation, and wherein D is a 16 kbit/s channel in which signaling characters (with priority) and telemetry signals and slow packet oriented data can be transmitted in multiplex.

The subscriber termination has an ISDN line interface, the so-called U-interface at the end of the subscriber line and an ISDN terminal interface, the so-called subscriber or S-interface, which is connected to the U-interface through a socalled network termination for functions within the level 1 and, under given conditions, within levels 2 and 3 of the ISO function level model. It is assumed that the S-interface has multi-point capability, that is, multiple device configurations can be formulated by means of branching at the S-interface, a plurality of ISDN terminals with S-interface being arranged therein in a bus, star or ring structure as described, for example, in "ZPF" 1982, volume 9, pages 24-31; Fernmeldetechnik 22 (1982) 2, pages 67-79; Fernmeldetechnik 23 (1983) 1, pages 6-9 and 9-14.

In an S-interface bus configuration, all connected terminals can access the D-channel (signaling channel) independently of one another, an allocation of a B-channel being effected thereover by the exchange equipment. Non-interfering access to the S-bus is controlled by the connected terminal in the D-channel itself. All bits proceeding from the terminals through the D-channel to the line termination which are to be forwarded from the line termination to the switching center are subjected to an AND operation for all simultaneously appearing bits and are thereafter fed back to the terminals through the S-interface in a separate D-echo channel in such a manner that 0 bits dominate over 1 bits, that is, when different terminals simultaneously transmit 0 bits and 1 bits in the D-channel, a 0 bit is always returned in the D-echo channel, so that a terminal which has transmitted a 1 bit perceives this deviation and discontinues its accessing attempt.

In the bus configuration, the S-interface enables connection of up to eight terminals given a bus length of about 150 meters, the range being about 1 kilometer in an individual device configuration having only one terminal or in a star configuration wherein each terminal is connected to a network termination through a separate line.

When a number of individual terminals are to be connected to a common ISDN network termination through separate S-interfaces, a problem is the manner by which the individual interface-associated D-channels in the network termination unit are to be united with the common D-channel proceeding to the switching control. It is an object of the present invention to provide a circuit for solving this problem which additionally permits selective internal traffic routing between the terminals connected to different S-interfaces of the network termination.

The above objects are inventively achieved in a circuit for a subscriber termination in an integrated services digital network wherein monofunctional or multifunctional terminals comprising an S-interface (which may be obtained under given conditions through a matching unit) are connected through a network termination to the subscriber line which forms an ISDN basic access. The B-channels proceed through the subscriber line between the ISDN network termination and a switching center and are respectively allocated to a terminal controlled by the switching center together with the D-channel combined therewith in multiplex, or fanned from multiplex in the network termination. The B-channels of the individual S-interfaces are individually conducted to a switching matrix network by means of which (controlled by a switching control) connections can be made of B-channels to each other or a B-channel can be connected to the switching center in multiplex with a common D-channel. The individual terminal-associated or bus-associated D-channels in the transmission direction toward the switching control are conducted through an AND gate to the common D-channel, which continues to the switching control. The output of the AND gate is also connected through a common D-echo channel to the individual terminal-associated or bus-associated D-echo channels of the opposite transmission direction. The individual or bus-associated D-channels in the transmission direction toward the switching control are also supplied to the inputs of an identifier which has an output connected to the switching control for identifying the particular S-interface from which the signal being transmitted arises.

The circuit disclosed and claimed herein as described above, which makes use of level 1 access protocol for accessing an S-bus in modified form for combining the D-channels of a number of S-interfaces individually conducted to the network termination unit with the common D-channel, and which can be employed both for S-terminations of the same subscriber as well as the S-terminations of different subscribers, offers the advantage of an uncomplicated realization of individual connection of a number of individual terminals to the common ISDN network termination unit by the terminal's own ISDN S-interface. The circuit also provides internal traffic routing between these terminals. Additionally the circuit provides greater flexibility in the configuration of ISDN multi-device terminations because the circuit permits connections of ISDN S-interface busses respectively combining a number of terminals in a common ISDN network termination.

The identifier utilized in the circuit may be in the form of a register into whose register locations (allocated to the D-channels of the individual S-terminations) the bits appearing in the individual D-channels are input only given the appearance of a 0 bit in at least 1 D-channel, and which indicates the S-interface transmitting the signal after the conclusion of a transmission in the common D-channel.

DESCRIPTION OF THE DRAWINGS

FIG. 2 is a schematic block diagram showing the details of the switching control unit shown in FIG. 1.

DESCRIPTION OF THE PREFERRED EMBODIMENTS

Figure 1:
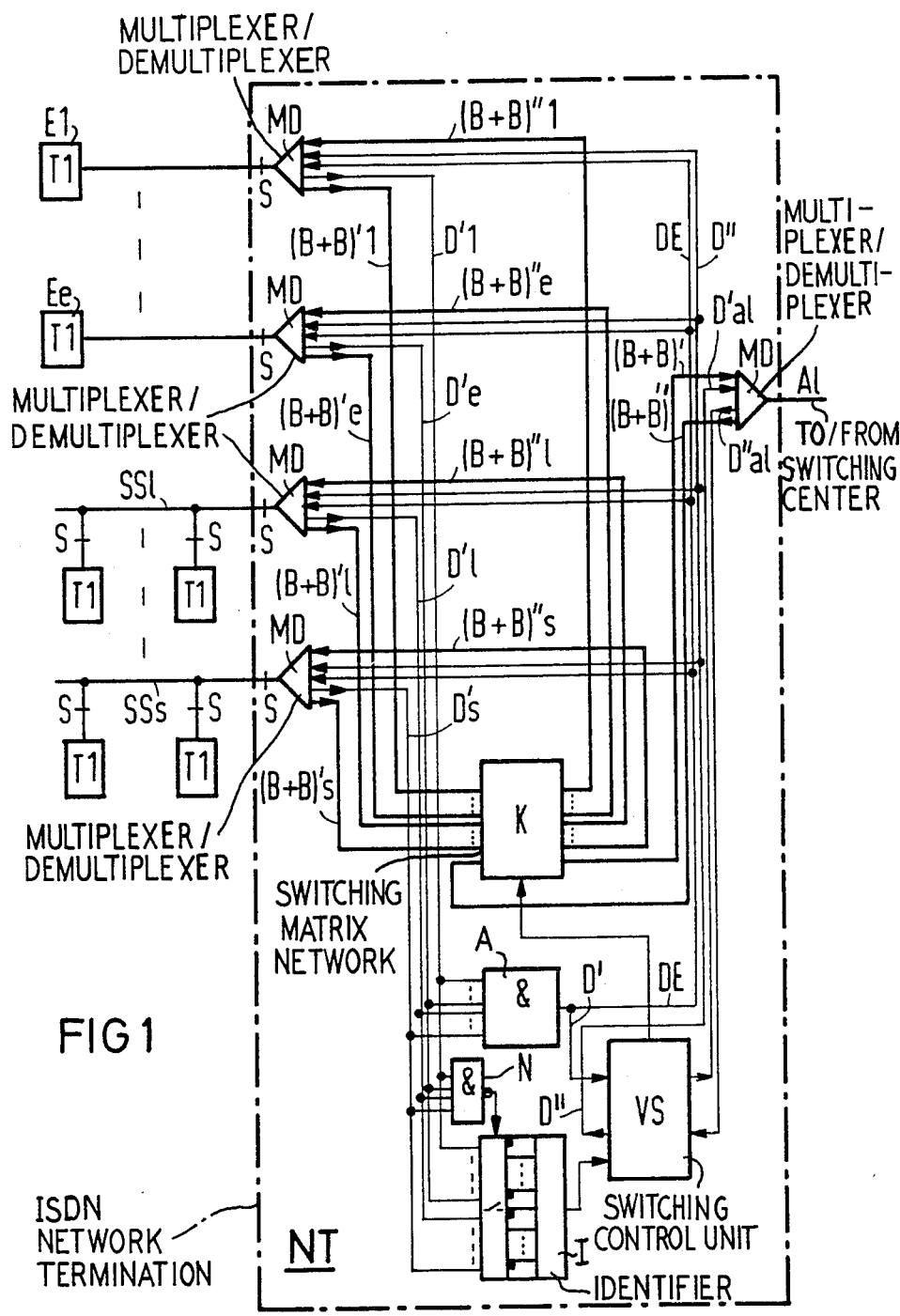
FIG. 1 is a schematic block diagram of a circuit for the subscriber termination in an integrated services digital network constructed in accordance with the principles of the present invention.

An ISDN network termination NT is shown in FIG. 1 having a plurality of S-interfaces designated S. Terminals E1...Ee are respectively individually connected to the ISDN S-interfaces S of the network termination NT. In addition, ISDN S-interface busses SS1 . . . SSs which each combine a plurality of terminals are connected to the network termination NT. The designation T1 for each of the individual terminals in FIG. 1 indicates that those terminals realize the so-called ISDN-T1 functions and thus meet the ISDN S-interface conditions. It is possible, however, that the actual terminal may include functions which do not meet these conditions, in which case a known adapter means which assures functional access to the ISDN must be allocated to the terminal. The S-interfaces of the ISDN network termination NT thus respectively form an ISDN basic access having the channel structure B—B+D per transmission direction, with the individual channels being time-multiplexed separately in respect of each transmission direction. The network termination NT is connected to a switching center (not shown in FIG. 1) through a subscriber line Al.

In the drawings and the accompanying description, the convention of a single prime for designating incoming signals (that is, signals transmitted in the direction toward the switching control unit VS) and a double prime to designate outgoing signals (that is, signals transmitted in the opposite direction away from the switching control unit VS) will be employed. As shown in FIG. 1, the channels (B+B)'1 . . . (B+B)'e for the individual terminal-associated B channels in the incoming direction, the channels (B+B)"1 . . . (B+B)"e for the individual terminal-associated B-channels in the outgoing direction, the channels (B+B)'1 . . . (B+B)'s for the bus-associated B-channels in the incoming direction and the channels (B+B)"1 . . . (B+B)"s for the bus-associated B-channels in the outgoing direction are connected to respective inputs and outputs of multiplexer/demultiplexer units MD. These channels are also each connected to respective inputs and outputs of a switching matrix network K controlled by a switching control unit VS connected thereto.

A subscriber line Al is connected to another mulitplexer/demultiplexer means MD to which another B-channel (B+B)' is supplied and from which B-channel (B+B)" is fanned. The switching matrix network K in response to signals received from the switching control unit VS makes connections between individual ones of the aforementioned subscriber-interface assocated B-channels, or between individual ones of those B-channels and the B-channels (B+B)' and (B+B)" conducted over the subscriber line Al. The signals on the subscriber line Al are transmitted in multiplex with a common D-channel D'al or D"al. This can proceed in a manner known in communications switching technology for the call through-connection, and does not form a part of the inventive concept disclosed and claimed herein.

The D-channels D'1 . . . D'e associated with individual terminals and the D-channels D'1 . . . D's associated with the bus terminals of the incoming transmission direction are connected through an AND gate A to a common D-channel D', which continues to the switching control unit VS. In the opposite transmission direction, a common D-channel D" is directly connected from an output of the switching control unit VS to the S-interface associated D-channels via the multiplexer/demultiplexer means MD. In this outgoing transmission direction, the output of the AND gate A is connected by means of a common D-echo channel DE to the individual terminal or bus-associated S-interfaces; the combining of the D-echo channel and the D-channel for each interface being undertaken in the multiplexer/demultiplexer means MD associated with a particular S-interface.

The bits received in the individual D-channels via the individual S-terminals of the network termination NT are thus respectively linked or combined by means of an AND function and the result of the AND operation proceeds back in the D-echo channel to all S-interfaces of the termination network NT, and thus to the terminals connected thereto. By exploiting the level 1 access protocol functions of the terminals, a non-intefering or "collision-free" access of the terminals individually connected to an S-interface of the network termination NT, or connected thereto via an S-bus, is controlled by the common D-channel D'. Before transmission is begun, the terminals each check whether the common D-channel is free. This is determined by the reception of a prescribed minimum number of successive 1 bits in the D-echo channel. A 0 bit is always returned in the D-echo channel DE as soon as, given simultaneous accessing attempts by a plurality of terminals, these terminals transmit mutually deviating 0 bits and 1 bits in the individual D-channels D'1 . . . D'e and D'1 . . . D's, so that a terminal which has emitted a 1 bit is capable of perceiving this deviation and of discontinuing its accessing attempt in response thereto. The free status of the common D-channel D' is thus characterized by a so-called "1 status," with a first 0 bit terminating this status, and 0 bits prevailing over 1 bits in the AND gate A. As is known to those skilled in this technology, according to the standard ISO 3309, every message begins with a flag 01111110 which is then followed by two addresses. Given simultaneous accessing attempts by two terminals, for example, the terminal which had transmitted a first one bit in such address will discontinue its accessing attempt given the first deviating address bit.

The switching matrix network K comprises a known network affording the possibility of all of the above-mentioned cross-connection between various B-channels. In the embodiment shown in FIG. 1 a 0 signal status prevails on the inputs 2 and the connections within the switching matrix network K in the idle or non-transmitting condition.

The aforementioned control of the switching matrix network K by the switching control unit VS assumes that the switching control unit is "aware" from which S-interface associated terminal E1 ... Ee or from which S-interface associated bus SS1 ... SSs the call set up is proceeding. That is, the switching control unit VS must know from where incoming information received on the common D-channel D' derives. For this purpose, an identifier I is provided in the network termination NT having a plurality of inputs respectively connected to the individual terminal-associated D-channels D'1 ... D'e and to the bus-associated D-channels D'1 ... D's in the incoming transmission direction. This connection is supplemented with a connection of the same D-channels to another input of the identifier I through a NAND gate N. In order to supply the switching control unit VS with a signal identifying the source of the signal currently being transmitted in the common D-channel D', the identifier I supplies information about the S-interface S which is the source for this signal. The identifier J comprises a register into whose locations allocated to the D-channels D'1 ... D'e and D'1 ... D's the bits appearing in those individual D-channels are read under the control of the NAND gate N. The bits are read into the register locations only given the appearance of a 0 bit in at least one of the D-channels. After conclusion of a signal transmission in the common D-channel D', the register then indicates that S-interface S from which the transmitted signal was received; it is that S-interface whose allocated register location is the only location containing a 0 bit.

As shown in greater detail in FIG. 2, the switching control unit VS comprises a register Reg' interconnected between the common D-channel lines D' and D'al in the incoming transmission direction and a register Reg" interconnected in the common D-channel lines D"al and D" in the opposite transmission direction. The two registers Reg' and Reg" respectively enable selection information transmitted in the common D-channel of the respective transmission direction to be supplied in parallel to respective converters Uk' and Uk". The identifier I simultaneously supplies the converter Uk' with source information identifying the S-interface from which the transmitted selection information originated, the information at the two inputs of the converter Uk' being converted thereby into corresponding setting information for the switching matrix network K so that the B-channel lines designated by the originating source information and the selection information are connected to each other. In an analogous manner, the converter Uk" converts selection information supplied to the register Reg" via the common D-channel line D"al into setting information for the switching matrix network K so that the common B-channel lines (lines (B+B)' and (B+B)" shown in FIG. 1) may be connected in the switching matrix network K to the B-channel lines from and to the S-interfaces designated by the selection information.

The above-described circuit enabling concentration of S-terminations of any desired type may be utilized for subscribers of a private branch exchange, as well as for subscribers connected to a public telecommunications network.

It is also within the scope of the inventive concept disclosed and claimed herein that the switching control unit VS not be included within the network termination NT, as would be typical for a private branch exchange, but rather the switching control unit VS may be a part of the switching center to which the network termination NT is connected via the line A1. In this case the common D-channels D' and D" would directly connect to the common D-channels D'al and D"al and the output of the identifier I would be bundled with the signals supplied to the switching center.

Furthermore, forwarding, concentrating or other multiplexing devices may be connected to the S-interfaces of the network termination NT instead of actual terminals.

Although other modifications and changes may be suggested by those skilled in the art it is the intention of the inventor to embody within the patent warranted hereon all changes and modifications as reasonably and properly come within the scope of his contribution to the art.

I claim as my invention:

1. A circuit for an integrated services digital network having a network termination connected through respective S-interfaces to a plurality of terminal lines, each terminal line having a B+B+D channel structure for each transmission direction, and said terminal lines each having one or more subscriber terminals connected thereto, said network termination being connected to a switching center via a subscriber line and having multiplexer/demultiplexer means associated with each terminal line and with said switching center for combining and fanning said B and D channels, said circuit comrising:

a switching matrix interconnected between said multiplexer/demultiplexer means associated with each terminal line and said multiplexer/demultiplexer means associated with said switching center, said switching matrix connecting the B channels of said terminal lines to each other or individually to said switching center;

a switching control means connected to said switching matrix for controlling the operation thereof for selecting said connections;

an AND means having inputs respectively connected through said multiplexer/demultiplexer means associated with each terminal line to the D-channels of each terminal line and having an output connected to said switching control means through a common D-channel and to said multiplexer/demultiplexer means associated with each of said terminal lines through a common D-echo channel, said D-echo channel supplying a signal to each of said terminal lines indicating a signal on said common D-channel thereby preventing access of remaining terminal lines to said switching matrix network; and an identifier means having inputs connected to said D-channels for each terminal line in a transmission direction towards said switching control means and having an output connected to said switching control means for transmitting information thereto identifying from which S-interface the signal on said common D-channel has been transmitted.

2. A circuit as claimed in claim 1 wherein said identified has a register having a plurality of register elements connectable to the respective D-channels of the S-interfaces, said register being read-in only upon the appearance of a 0 bit in at least one D-channel and indicating, after the conclusion of a signal transmission on said common D-channel, the S-interface which transmitted said signal.

3. A circuit as claimed in claim 1 wherein said switching control means has at least one register connected to said common D-channel and having an output connected to a converter, the output of said identifier being connected to another input of said converter, said converter combining the output of said register and said identifier for generating a signal for controlling said switching matrix network.

4. A circuit as claimed in claim 1 wherein said switching control means is contained within said network termination.

5. A circuit as claimed in claim 1 wherein said switching control means is connected to said network termination through a subscriber line.

* * * * *